United States Patent
Brückner et al.

(10) Patent No.: US 9,387,436 B2
(45) Date of Patent: Jul. 12, 2016

(54) EXHAUST-GAS PURIFICATION DEVICE AND METHOD FOR THE REDUCTION OF NITROGEN OXIDES FROM AN EXHAUST GAS OF A FOSSIL-FIRED POWER PLANT

(71) Applicant: SIEMENS AKTIENGESELLSCHAFT, München (DE)

(72) Inventors: Jan Brückner, Uttenreuth (DE); Thomas Hammer, Hemhofen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/410,210

(22) PCT Filed: May 21, 2013

(86) PCT No.: PCT/EP2013/060386
§ 371 (c)(1),
(2) Date: Dec. 22, 2014

(87) PCT Pub. No.: WO2014/000977
PCT Pub. Date: Jan. 3, 2014

(65) Prior Publication Data
US 2015/0336051 A1 Nov. 26, 2015

(30) Foreign Application Priority Data

Jun. 27, 2012 (DE) .................. 10 2012 210 997

(51) Int. Cl.
*B01D 53/56* (2006.01)
*B01D 53/86* (2006.01)

(52) U.S. Cl.
CPC .......... *B01D 53/8631* (2013.01); *B01D 53/864* (2013.01); *B01D 2255/1021* (2013.01); *B01D 2255/504* (2013.01); *B01D 2258/0283* (2013.01)

(58) Field of Classification Search
CPC ... B01D 53/56; B01D 53/565; B01D 53/8625
See application file for complete search history.

(56) References Cited

U.S. PATENT DOCUMENTS 5,224,334 A * 7/1993 Bell .................. B01D 53/8625
110/212
6,479,026 B1 11/2002 Iida
(Continued)

FOREIGN PATENT DOCUMENTS

CN 101321575 A 12/2008
EP 0753701 B1 9/1999
(Continued)

OTHER PUBLICATIONS

International Search Report for PCT application No. PCT/EP2013/060386, mailed Oct. 28, 2013.

*Primary Examiner* — Timothy Vanoy
(74) *Attorney, Agent, or Firm* — Schmeiser, Olsen & Watts, LLP (57) ABSTRACT

A catalytic exhaust gas purification device and method for the reduction of nitrogen oxides from an exhaust gas of a fossil-fired power plant, having a heating gas duct along a flow direction and having a reactor chamber which is arranged in the heating gas duct is provided. In the reactor chamber there are arranged a first reduction reactor for the reduction of nitrogen oxides NOx to form water $H_2O$ and nitrogen $N_2$, an oxidation reactor, which is connected downstream of the first reduction reactor in the flow direction, for the oxidation of nitrogen monoxide NO to form nitrogen dioxide NO2, and a second reduction reactor, which is connected downstream of the oxidation reactor in the flow direction, for the reduction of nitrogen oxides NOx to form water $H_2O$ and nitrogen $N_2$. A reduction of nitrogen oxides NOx from an exhaust gas of a fossil-fired power plant is achieved.

19 Claims, 3 Drawing Sheets (56) References Cited

U.S. PATENT DOCUMENTS

| | | | |
|---|---|---|---|
| 6,958,133 B2 * | 10/2005 | Hammer | B01D 53/1456 422/171 |
| 7,638,107 B1 | 12/2009 | Duck | |
| 7,914,747 B1 * | 3/2011 | Kraemer | B01D 53/1456 422/170 |
| 2008/0112870 A1 | 5/2008 | Curran | |
| 2014/0199221 A1 * | 7/2014 | Suchak | B01D 53/56 423/235 |

FOREIGN PATENT DOCUMENTS

| | | | | |
|---|---|---|---|---|
| EP | 1820560 A1 * | 8/2007 | | A61L 9/14 |
| EP | 1147801 B2 * | 12/2014 | | B01D 53/9418 |
| JP | 2008126124 A | 6/2008 | | |
| WO | WO 9701387 A1 * | 1/1997 | | B01D 53/8631 |
| WO | WO 9939809 A1 * | 8/1999 | | B01D 53/9431 |
| WO | WO 2006025900 A2 | 3/2006 | | |

* cited by examiner

EXHAUST-GAS PURIFICATION DEVICE AND METHOD FOR THE REDUCTION OF NITROGEN OXIDES FROM AN EXHAUST GAS OF A FOSSIL-FIRED POWER PLANT

CROSS-REFERENCE TO RELATED APPLICATIONS

This application claims priority to PCT Application No. PCT/EP2013/060386 having a filing date of May 21, 2013, based off of DE 102012210997.8 having a filing date of Jun. 27, 2012, the entire contents of which are hereby incorporated by reference.

FIELD OF TECHNOLOGY

The following relates to the combustion of fossil fuels in power stations which results in formation of, depending on the fuel used and mode of operation of the power station, various combustion products which leave the power station as emissions. Part of the emissions, e.g. ash, sulfur dioxide $SO_2$ or mercury Hg, are associated with impurities in the fuel and can therefore be decreased through the use of high-quality but expensive fuels. However, other emissions, e.g. carbon dioxide $CO_2$ or nitrogen oxides $NO_x$, are associated with general fuel properties, oxidants used or operating parameters of the combustion process and therefore cannot be reduced significantly by the quality of the fuel used. The emission of carbon dioxide $CO_2$ is caused in principle by the use of carbon-containing fuels. In addition, in the case of gas turbines, the quality of the fuels which can be used is generally defined precisely.

BACKGROUND

Nitrogen oxide emissions $NO_x$ are also a consequence of the operating parameters of the combustion process but are due in principle to the use of air, which comprises virtually 80% of nitrogen N, as oxidant. The nitrogen oxide emissions in particular are, because of their potential for the formation of acid rain and summer smog, subject matter of legal limits which are becoming more demanding in steps and are partially achieved in the case of new plants by means of optimized combustion processes but in the case of existing plants require after-treatment of the flue gases.

For the present purpose, the expression $NO_x$ refers to the nitrogen monoxide NO which is initially formed in the combustion together with the nitrogen dioxide $NO_2$ to which the NO is oxidized by slow reactions in air.

Increased nitrogen oxide emissions $NO_x$ are found particularly in the case of high combustion temperatures and long gas residence times at high temperatures, while high carbon dioxide emissions $CO_2$ occur, inter alia, in the case of very lean combustion with an insufficient gas residence time under conditions for complete oxidation of the fuel, and are then often associated with an efficiency decrease compared to optimal combustion.

Existing power stations are, in order to reduce the nitrogen oxide emissions $NO_x$, equipped with, inter alia, facilities for carrying out the selective catalytic reduction (SCR) of the nitrogen oxides $NO_x$ with ammonia $NH_3$ as reducing agent; these facilities are designed for over 90% of the nitrogen oxides $NO_x$ occurring as nitrogen monoxide NO due to process conditions. Catalysts used are typically $TiO_2N_2OF_1O_3$ mixtures which have various mixing ratios and selectively absorb ammonia $NH_3$ and reduce nitrogen monoxide NO in a catalytic surface reduction according to the overall reaction equation:

$$4\ NO + 4\ NH_3 + O_2 \rightarrow 4\ N_2 + 6\ H_2O \qquad (a)$$

This reaction proceeds successfully in a temperature range from 250° C. to 450° C. Below 250° C., the reaction very quickly becomes slower because of the energy required for activation. Above 450° C., the catalytic oxidation of $NH_3$ firstly to $N_2O$ and finally to NO commences.

For this reason, in order to effect a decrease in oxides of nitrogen, it has been proposed in EP 0 753 701 B1 that, for use in heating boilers, for example, a device be arranged between a high-temperature preheater and a low-temperature preheater in a steam generator in order to achieve the appropriate temperature range for decreasing the nitrogen oxide. However, such an arrangement increases the construction volume of a heating boiler considerably, because firstly surfaces for the heat exchanger and secondly surfaces or volumes for the $NO_x$ reduction have to be provided. Here, it is immaterial whether the reduction is carried out catalytically or not catalytically. In the case of a catalytic reduction, large surface areas on which a rapid reduction according to equation (a) occurs have to be provided. In the case of a noncatalytic reduction, a series of slow volume reductions, which compared to the catalytic reduction also have the disadvantage of a significantly lower selectivity and a high risk of formation of $NO_2$ as by-product, occur in a comparatively narrow temperature interval at a comparatively significantly higher temperature level. $NO_2$ is a greenhouse gas which can be degraded only slowly and has approximately 40 times the greenhouse potential of $CO_2$.

It was proposed in EP 1 820 560 A1 that the surfaces made available by heat exchangers of a heating boiler or a waste heat steam generator of a gas turbine be made usable for flue gas purification, in particular for the selective catalytic reduction of nitrogen oxides and the oxidation of carbon monoxide CO by coating with catalytic material. However, a closer study of this proposal indicates that in the case of a waste heat steam generator the surfaces made available at temperature levels in the range from 250° C. to 450° C. are not sufficient for lasting, reliable reduction of the nitrogen oxides of significantly over 50% even when coated with highly active nanoparticulate catalysts. Robust catalysts having a long life have, compared to the nanoparticulate catalysts, a significantly smaller internal surface area and thus a lower activity and therefore allow degrees of reduction of only 30% or less from the beginning.

The low degrees of reduction of robust catalysts having a long life have various causes. In the case of powder catalysts, the active surface area is from about 45 to 60 $m^2/g$. In the case of catalytic coating of metallic surfaces of heat exchangers, on the other hand, significantly smaller values of the active surface area have to be expected. In addition, the catalytic reactions are in this case limited by transport processes, so that only a fraction of the active catalytic surface areas is actually utilized. Furthermore, in the case of waste heat steam generators a considerable part of the surfaces is at a temperature level below 250° C.

It is known from WO 99/39809 and EP 1 147 801 A1 that, in the field of exhaust gas purification for internal combustion engines, in particular diesel engines, more efficient reduction of nitrogen oxides NO can be achieved by firstly passing the exhaust gas over an oxidation catalyst which typically oxidizes from 30 to 70% of the NO to $NO_2$, then adding $NH_3$ as reducing agent and passing the exhaust gas admixed with reducing agent over an SCR catalyst. This effect, also known as "fast SCR reaction", proceeds at significantly lower temperatures than the SCR reaction. However, for thermodynamic reasons, the oxidation catalyst oxidizes NO efficiently to $NO_2$ only below a temperature of 400° C.

Figure 1:
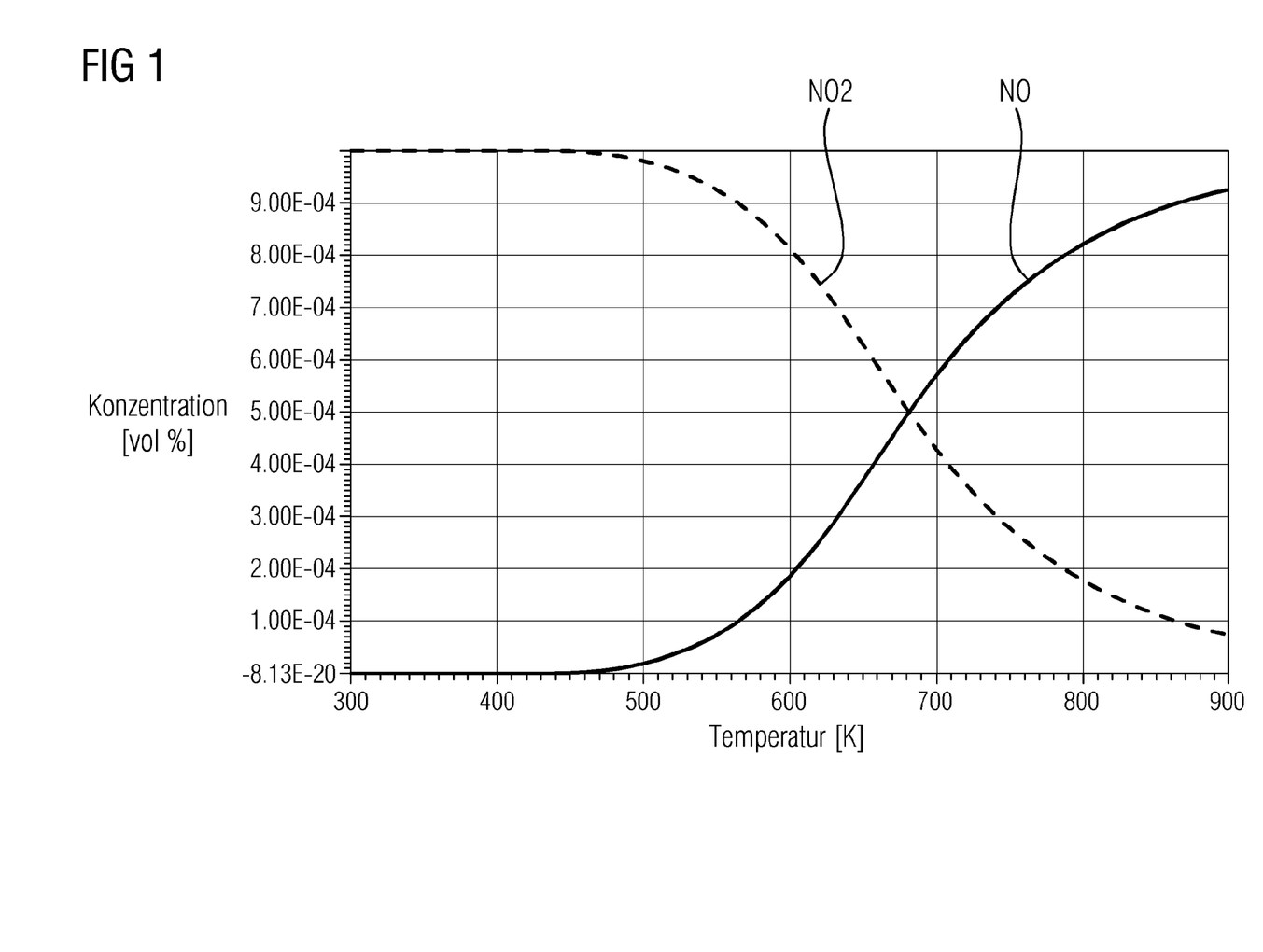
FIG. 1 a chemical equilibrium between NO and $NO_2$ in a flue gas.

FIG. 1 shows a thermodynamic equilibrium calculation for NO and $NO_2$. The concentration in percent by volume is plotted against the temperature in kelvin. According to this, the maximum achievable degree of conversion decreases with increasing temperature. At 400° C., the degree of conversion is below 50%; at 450° C. at below 40%. The thermodynamic limit value can be achieved only when using very large reactors and is therefore not realistic in practice. Owing to limited reaction rates, a conversion of typically only 70% of the thermodynamic limit value can be expected in a compact reactor.

In combined gas and steam power stations (GaS), the temperature of the gas entering the waste heat steam generators is in the range from 450° C. to 500° C. The benefit gained from the fast SCR reaction for reducing the $NO_x$ emissions would therefore be relatively small since the $NO_2$ would have been consumed completely at relatively high temperatures and the relatively low temperatures at which it would bring the greatest benefit would no longer be available.

SUMMARY

An aspect relates to providing a process by means of which the nitrogen oxide content $NO_x$ of an exhaust gas from a combustion process can quickly be decreased with high efficiency and in a small construction space. A further aspect of the invention proposes a catalytic exhaust gas purification apparatus by means of which reduction of nitrogen oxides $NO_x$ in an exhaust gas from a fossil fuel-fired power station can be achieved with high efficiency and in a small construction space.

The reduction of nitrogen oxides $NO_x$ occurs in three stages in successive reaction processes. In a first reaction process, the exhaust gas and a first reducing agent are fed in and part of the nitrogen oxides $NO_x$ present in the exhaust gas is reduced to water $H_2O$ and nitrogen $N_2$ by selective catalytic reduction at a first reaction temperature, forming an exhaust gas having a reduced nitrogen oxide content $NO_x$. In a second reaction process, part of the nitrogen monoxide NO present in the exhaust gas having a reduced nitrogen oxide content is oxidized by means of oxygen $O_2$ at a second reaction temperature to form nitrogen dioxide $NO_2$, forming an exhaust gas having a ratio of nitrogen monoxide NO to nitrogen dioxide $NO_2$. In a third reaction process, the exhaust gas and a second reducing agent are fed in and nitrogen monoxide NO and nitrogen dioxide $NO_2$ are reduced to water $H_2O$ and nitrogen $N_2$ by fast selective catalytic reduction by means of the second reducing agent at a third reaction temperature, forming an exhaust gas which has been essentially freed of nitrogen oxides $NO_x$.

Embodiments of the invention combine the process of fast catalytic reaction with the process of conventional selective catalytic reduction in such a way that the two processes each proceed in their optimal operating range and that a maximum degree of conversion can be achieved thereby. Utilization of the fast catalytic reduction increases the efficiency of the $NO_x$ reduction in the low-temperature range of a steam generator and makes large, existing surface areas of the steam generator additionally available for utilization in the conventional process of selective catalytic reduction. Oxidation of relatively large amounts of reducing agent is avoided by means of the multistage process. Since less reducing agent has to be added in order to achieve the same $NO_x$ reduction, the process costs can also be reduced thereby.

In addition, $NH_3$ is oxidized not only to $N_2$ but frequently to $N_2O$, NO and in the extreme case $NO_2$ over most oxidation catalysts. An arrangement in which the reducing agent-containing flue gas is passed over the oxidation catalyst would therefore be associated with tremendous disadvantages.

A further advantage of the process indicated here compared to pure, conventional SCR processes is that it leads to significantly lower CO emissions. Classical SCR catalysts such as the abovementioned $TiO_2V_2O_5WO_3$ do reduce emissions of unburnt hydrocarbons, but oxidize these only incompletely, so that the emission of CO can, depending on the case, even increase.

In the process of embodiments of the invention, on the other hand, the oxidation catalyst ensures that CO and possibly also unburnt hydrocarbons present are oxidized to $CO_2$. According to embodiments of the invention, the efficiency of $NO_x$ reduction which can be achieved in catalytically coated, multistage steam generators is increased, without provision of additional surfaces which are not actually required for steam generation, to such an extent that additional flue gas after-treatment is no longer necessary.

The first reaction temperature is advantageously set in the range from 250° C. to 450° C., the third reaction temperature is set in the range from 80° C. to 250° C. and the second reaction temperature is set in between the first and second reaction temperatures.

The setting of the reaction temperatures can be carried out indirectly via the preceding combustion process. The temperature range of the first reaction temperature corresponds to a temperature which is optimal for conventional SCR. The temperature range of the second reaction temperature is between the first reaction temperature and the second reaction temperature, i.e. in the range from 80° C. to 450° C., and is thus in the optimal range for an oxidation reaction. The process of embodiments of the invention can therefore also be used for the reduction of nitrogen oxides $NO_x$ for the waste heat steam generator following a gas turbine in a GaS power station, which has gas inlet temperatures in the range from 450° C. to 500° C.

In an advantageous embodiment of the process, the first reducing agent introduced into the exhaust gas is metered in by means of a first regulating process so that, on average over time, complete conversion of the first reducing agent is achieved in the first catalysis process. For this purpose, the exhaust gas mass flow $Q_{Ag1}$, the nitrogen monoxide NO concentration $C_1$ and the exhaust gas temperature $T_4$ are measured in a first measurement procedure upstream of the first catalysis process in the first regulating process and an expected concentration $C_2$ of nitrogen monoxide NO after the first catalysis process is determined by means of characteristic data on the nitrogen monoxide reduction, as a function of the temperature, loading of ammonia $NH_3$ in the first catalysis process and the nitrogen monoxide (NO) concentration $C_1$.

In a downstream second measurement procedure, which is between the first catalysis process and the second catalysis process, the nitrogen monoxide (NO) concentration $C_3$ is measured. After the second measurement procedure, the calculated concentration $C_2$ is compared with the measured concentration $C_3$ and the introduction of the first reducing agent is decreased as soon as the calculated concentration $C_2$ becomes smaller than the measured concentration $C_3$.

The second catalysis process is advantageously controlled in such a way that a largely balanced ratio of nitrogen monoxide NO to nitrogen dioxide $NO_2$ is achieved. Such a balanced ratio in which the molar concentrations of NO and $NO_2$ are approximately equal is the optimum starting position for carrying out the fast SCR.

In a particular embodiment of the process, the second reducing agent introduced into the exhaust gas is metered in by means of a second regulating process so that, on average over time, complete conversion of the second reducing agent is achieved in the third catalysis process. Here, the exhaust gas temperature $T_5$ and the mass flow of exhaust gas $Q_{Ag2}$ is measured in the second measurement procedure in the second regulating process, and the concentration $C_4$ of nitrogen dioxide $NO_2$ and a degree of reduction G which can be achieved in the third catalysis process are determined by means of characteristic data for the second catalysis process.

In a subsequent third measurement procedure carried out after the third catalysis process, the exhaust gas temperature $T_5$ and the nitrogen dioxide $NO_2$ concentration are measured. The calculated concentration $C_4$ is then compared with the measured concentration $C_5$ and the introduction of the second reducing agent is set with the aid of the achievable degree of reduction G and reduced as soon as the calculated concentration $C_2$ becomes lower than the measured concentration $C_5$. If the difference between calculated and measured NO concentration exceeds a particular threshold, proper functioning of the catalyst is no longer ensured, so that maintenance becomes necessary. This can be prevented by definition of a suitable threshold and output of a warning signal in a control system.

In an advantageous embodiment of the process, ammonia $NH_3$ or a substance which releases ammonia is used as first reducing agent and as second reducing agent. Preference is given to using urea as ammonia-releasing substance.

The process is advantageously employed in a fossil fuel-fired power station. This can, for example, be a GaS power station or a steam power station having a fossil fuel-fired boiler.

The aspect directed at a catalytic exhaust gas purification apparatus is achieved according to embodiments of the invention by the features of claim 10. The apparatus for the reduction of nitrogen oxides in an exhaust gas of a fossil fuel-fired power station has a heating gas channel extending along a flow direction and a reactor space arranged in the heating gas channel. A first reduction reactor for reducing nitrogen oxides $NO_x$ to water $H_2O$ and nitrogen $N_2$ is present in the reactor space. An oxidation reactor for oxidizing nitrogen monoxide NO to nitrogen dioxide $NO_2$ is located downstream of the first reduction reactor. A second reduction reactor for reducing nitrogen oxides $NO_x$ to water $H_2O$ and nitrogen $N_2$ is in turn located downstream of the oxidation reactor.

In a particular embodiment of the catalytic exhaust gas purification apparatus, the first reduction reactor comprises heating surfaces which on at least one part have a first catalytic coating which is selective for nitrogen oxides $NO_x$ and is stable up to a temperature of 500° C. For the first catalytic coating, it is possible to use conventional SCR catalysts, e.g. $TiO_2/V_2O_5/WO_3$ or ion-exchanged zeolites which are applied to the surface, fixed and activated by slurrying, drying and optionally calcining In a further particular embodiment of the catalytic exhaust gas purification apparatus, the oxidation reactor comprises heating surfaces which on at least one part have a second catalytic coating which is selective for nitrogen oxides $NO_x$ and is stable up to a temperature of 300° C. This is preferably a noble metal-containing catalyst, e.g. platinum on aluminum oxide ($Pt-Al_2O_3$) or an ammonium-ion-exchanged ZSM5 zeolite ($Pt-NH_4ZSM5$) as support material.

The second reduction reactor preferably comprises heating surfaces which on at least one part have a third catalytic coating which is selective for nitrogen oxides $NO_x$ and is stable up to a temperature of 250° C.

In an advantageous embodiment of the catalytic exhaust gas purification apparatus, the first catalytic coating and the third catalytic coating are SCR catalyst layers which have thicknesses of greater than 10 µm and less than 50 µm, so that a reduction reaction of nitrogen oxides $NO_x$ with ammonia $NH_3$ to water $H_2O$ and nitrogen $N_2$ can be carried out. Heat transfer at the surfaces of the heat exchangers is not significantly hindered because of the small thickness of the catalyst layers. Thinner layers would lead to a reduction in the catalytic activity and a short life, while thicker layers would adversely affect heat transfer because of the porosity and the lower thermal conductivity associated therewith.

In a particular embodiment of the catalytic exhaust gas purification apparatus, the second catalytic coating is a noble metal-containing coating which has a thickness of greater than 10 µm and less than 50 µm and whose geometric surface area is less than 30% of the geometric surface area of the first catalytic coating, so that an oxidation reaction of nitrogen monoxide NO with oxygen $O_2$ to form nitrogen dioxide $NO_2$ can be carried out. Owing to the high activity of noble metal-containing catalysts, a fraction of the geometric surface area of the oxidation reactor is sufficient for this stage.

In an advantageous embodiment of the catalytic exhaust gas purification apparatus, a first injection device is arranged upstream of the first reduction reactor and a second injection device is arranged upstream of the second reduction reactor, with the first injection device having a first regulating valve and the second injection device having a second regulating valve and the injection devices each consisting of a number of nozzle heads which are distributed over the area of the reactors. The nozzle openings of the reactors have a spacing so that a reducing agent can be injected uniformly distributed over the flow cross section of the reactors.

As a result, a uniform distribution of the reducing agent in the heating gas is effected even without additional mixers up to the catalytically coated heat exchangers. The pressure drop along the flow can be kept small in this way. The reducing agent can either be gaseous $NH_3$, so that the injectors are gas injectors, or it can be an aqueous solution of a reducing agent which liberates $NH_3$, e.g. urea, so that the injectors are injectors of liquids. Uniform distribution of the concentration of the reducing agent over the flow cross section is ensured by a field of injectors and optionally associated means, e.g. static mixers for mixing the flue gas stream with reducing agent.

In a further advantageous embodiment of the catalytic exhaust gas purification apparatus, a regulating device which comprises a first measurement unit and a second measurement unit which are connected in a signal-transmitting manner to a first evaluation unit is provided and the regulating device comprises a third measurement unit which is connected in a signal-transmitting manner to a second evaluation unit and the first evaluation unit is connected in a signal-transmitting manner to the first regulating valve and the second evaluation unit is connected in a signal-transmitting manner to the second regulating valve. In this way, a reducing agent which can be introduced via the first and second regulating valves can be supplied in a targeted manner to the first catalysis process and the second catalysis process, so that complete conversion of the reducing agent is achieved on average over time during operation of the catalytic exhaust gas purification apparatus. The regulating device can also have a plurality of measurement units and regulating valves.

The catalytic exhaust gas purification apparatus is advantageously used in the case of heating surfaces which are superheater heating surfaces, vaporizer heating surfaces or economizer heating surfaces. Here, the catalytic exhaust gas purification apparatus is constituent of a waste heat steam generator in a fossil fuel-fired power station.

BRIEF DESCRIPTION

Some of the embodiments will be described in detail, with reference to the following figures, wherein like designations denote like members, wherein.

DETAILED DESCRIPTION

FIG. 1 shows a thermodynamic equilibrium calculation for NO and $NO_2$. The concentration in percent by volume is plotted against the temperature in kelvin. The maximum achievable degree of conversion decreases with increasing temperature.

Figure 2:
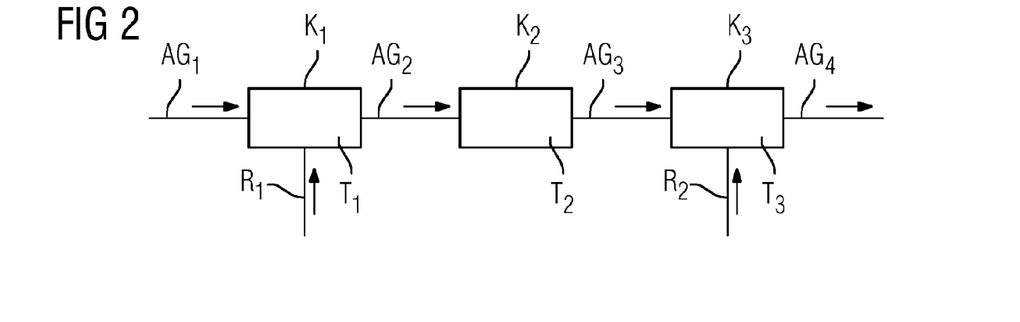
FIG. 2 an example of a process for the reduction of nitrogen oxides $NO_x$ in a nitrogen oxide-containing exhaust gas in the form of a process flow diagram.

The process flow diagram depicted in FIG. 2 shows a simplified representation of the process of embodiments of the invention in the form of the three reaction processes K1, K2 and K3.

An exhaust gas AG1 and a reducing agent R1 are fed to the first reaction process K1. Gaseous ammonia $NH_3$ or an aqueous solution of a reducing agent which liberates ammonia $NH_3$, e.g. urea, is used as reducing agent. At a reaction temperature T1, which is set in the range from 250° C. to 450° C., part of the nitrogen oxides present in the exhaust gas is reduced to water $H_2O$ and nitrogen $N_2$ by selective catalytic reduction. This forms an exhaust gas AG2 having a reduced nitrogen oxide content $NO_x$. The exhaust gas AG2 having a reduced nitrogen oxide content $NO_x$ is subsequently fed to a second reaction process K2. In the second reaction process K2 is fed in.

In the second reaction process K2, part of the nitrogen monoxide NO present in the exhaust gas is oxidized to nitrogen dioxide $NO_2$ by means of oxygen $O_2$. This forms an exhaust gas AG3 having a ratio of nitrogen monoxide NO to nitrogen dioxide $NO_2$.

The exhaust gas AG3 is fed together with a reducing agent R2 to a third reaction process K3. At a reaction temperature T3, which is set in the range from 80° C. to 250° C., nitrogen monoxide NO and nitrogen dioxide $NO_2$ are reduced by fast selective catalytic reduction to water $H_2O$ and nitrogen $N_2$ by means of the reducing agent R2. This forms an exhaust gas AG4 which has been essentially freed of nitrogen oxides $NO_x$. The reaction temperature T2 in the second reaction process K2 is set between the first reaction temperature T1 and the third reaction temperature T3.

Figure 3:
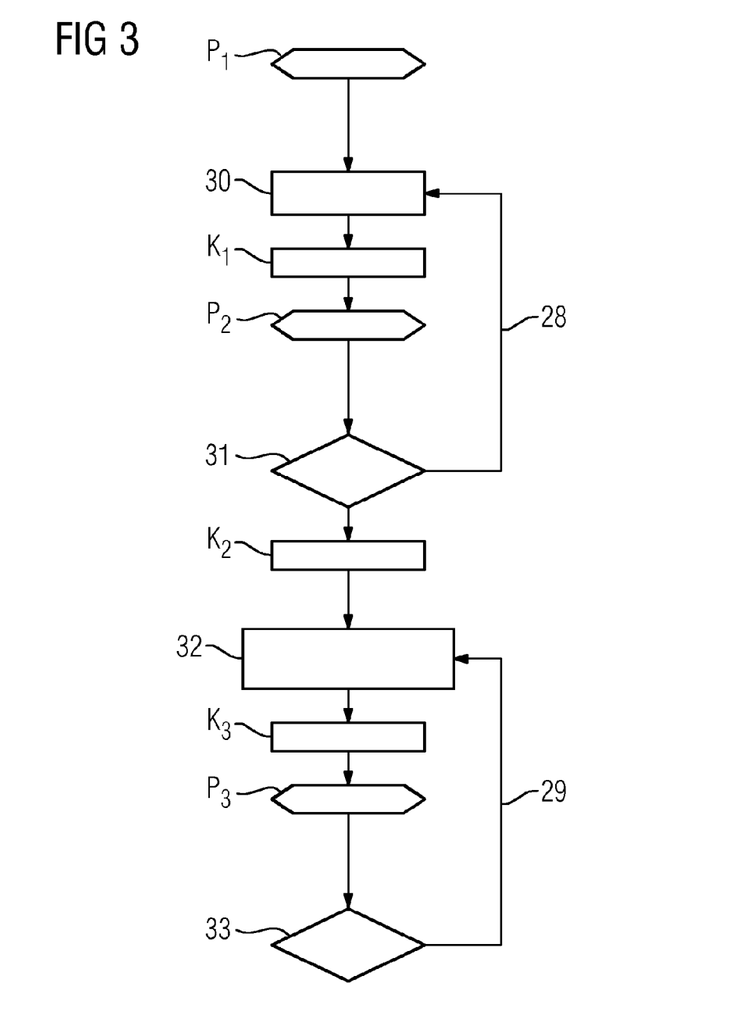
FIG. 3 an example for regulating a process for the reduction of nitrogen oxides $NO_x$ in a nitrogen oxide-containing exhaust gas in the form of a flow diagram.

FIG. 3 shows an example for regulating a process for the reduction of nitrogen oxides $NO_x$ in a nitrogen oxide-containing exhaust gas from a gas turbine plant in the form of a flow diagram.

Firstly, the nitrogen oxide concentration NO and the temperature of the exhaust gas or flue gas stream is measured by means of a measurement procedure P1 which takes place at the inlet of the waste heat steam generator 27. Proceeding from these data and from operating data of the burner of the gas turbine, the amount of reducing agent R1 to be introduced into the first reaction process K1 is calculated and controlled in an evaluation and control process 30. The reducing agent R1 is introduced in the reaction process K1. After the first reaction process K1, a further measurement procedure P2 is carried out.

The measurement data from the second measurement procedure P2 are transmitted to a first control process 31. The control process 31 calculates the NO concentration at the output from the first reaction process K1 or at the second measurement procedure P2. For this purpose, characteristic data for the reduction of nitrogen oxide NO as a function of the temperature distribution, the $NH_3$ loading of the first reaction process and the NO concentration of the exhaust gas introduced is employed. The calculated NO concentration is then compared with that actually measured. If the calculated concentration is lower than the measured concentration, the reducing agent consumption is lower than anticipated in the metered introduction. To avoid reducing agent breakthrough, the amount introduced has to be reduced. If the difference between calculated and measured NO concentration exceeds a particular threshold, proper functioning of the catalyst is no longer ensured, so that maintenance or the issuing of an error alarm is necessary. The information as to whether the amount of the reducing agent R1 introduced is to be reduced or increased is transmitted by a first regulating process 28 to the first evaluation and control process 30 and the introduction is regulated appropriately thereby.

The first control process 31 is followed by the second reaction process K2. The second reaction process K2 is then followed by a second evaluation and regulating process 32.

In the second evaluation and regulating process 32, the NO concentration at the inlet of the second reaction process K2, the temperature distribution and the mass flow is used for calculating, with the aid of characteristic data of the second reaction process K2, the conversion of NO into $NO_2$. This gives the magnitude of the degree of reduction which can be achieved in the third reaction process K3. As a function thereof, the metered introduction of the reducing agent R2 after the second reaction process K2 is set. A third measurement procedure P3 determines the temperature and the $NO_x$ concentration at the outlet of the third reaction process K3 and transmits these data to a second control process. The second control process 33 calculates, on the basis of a comparison of the calculated value with the measured value of the $NO_x$ concentration at the output of the third reaction process or at the third measurement procedure, whether the amount of the second reducing agent R2 introduced has to be corrected. The information regarding a possible correction is transmitted via a second regulating process 29 back to the second evaluation and regulating device 32. Here too, a threshold which if exceeded results in issue of a warning is set for the difference between calculated and measured $NO_x$ concentration.

Figure 4:
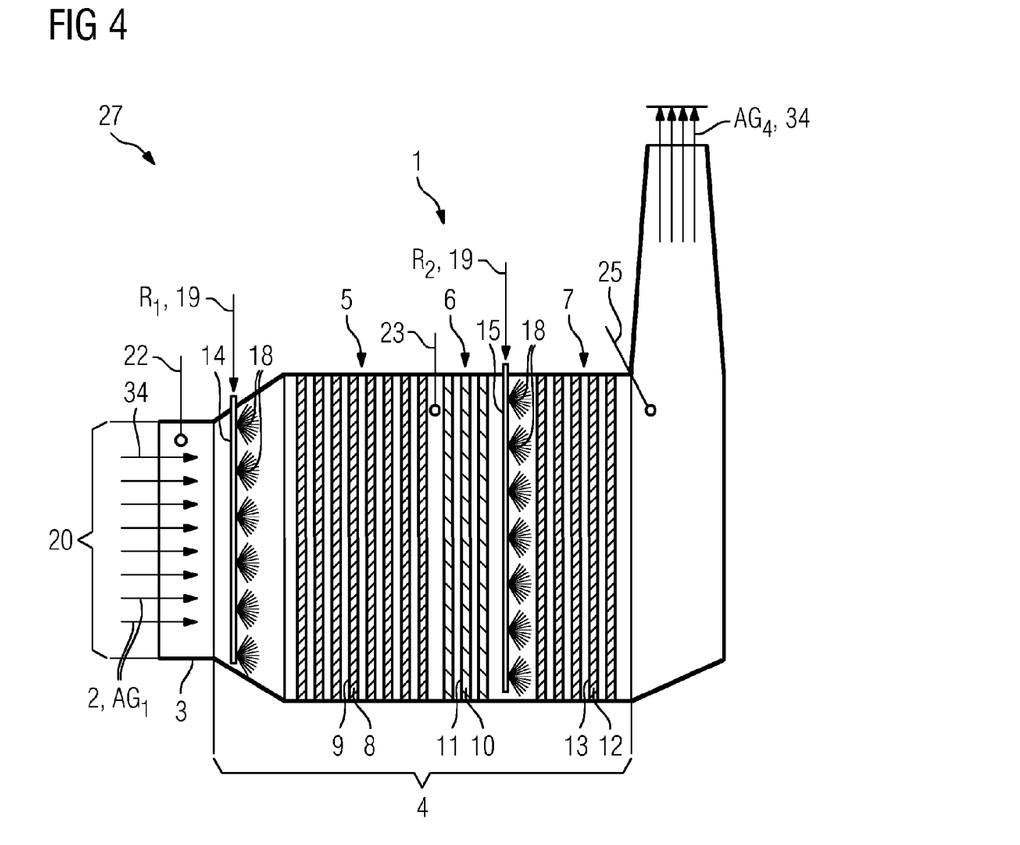
FIG. 4 a waste heat steam generator having a catalytic exhaust gas purification apparatus for the reduction of nitrogen oxides in an exhaust gas from a fossil fuel-fired power station.

The waste heat steam generator 27 depicted in FIG. 4 is shown in vertical section. The waste heat steam generator 27 comprises a catalytic exhaust gas purification apparatus 1 for the reduction of nitrogen oxides and consists essentially of the heating gas channel 3 and the reactor space 4. The waste heat steam generator 27 shown here can, for example, be used in a fossil fuel-fired power station.

An exhaust gas 2, AG1, which originates, for example, from a gas turbine plant is introduced in the flow direction 20 over the flow cross section 20 into the heating gas channel 3 of the waste heat steam generator 27. After entry of the exhaust gas 2, or AG1, into the heating gas channel 3, temperature and concentration of pollutants, in particular NO, are measured by means of a first measurement unit 22 provided with sensors. The mass flow of the exhaust gas is determined by the regulated combustion process of the gas turbine plant and can therefore be assumed to be known. From the heating gas channel 3, the exhaust gas 2, AG1, flows into the reactor space 4. The reactor space 4 consists essentially of a first reduction reactor 5, an oxidation reactor 6 and a second reduction reactor 7.

A reducing agent 19 can be injected via a first injection device 14 into the first reduction reactor 5. For this purpose, the first injection device 14 has a number of nozzle openings 18 by means of which a uniform distribution of the concentration of the reducing agent 19 over the flow cross section 20 of the exhaust gas 2 is achieved. The exhaust gas 2 which has been admixed with reducing agent 19 then flows into the first reduction reactor 5.

In contrast, in an advantageous embodiment of the exhaust gas purification apparatus 1 which is not shown here, the reducing agent 19 is injected distributed over the flow cross section of the exhaust gas 2 so far in front of the first reduction reactor 5 that even without additional mixers or injection devices 14 a uniform distribution of the reducing agent 19 in the exhaust gas 2 occurs up to the catalytically coated heat exchangers because the pressure drop along the flow can be kept small thereby. The reducing agent 19 can either be gaseous $NH_3$, so that the injectors are gas injectors, or can be an aqueous solution of a reducing agent which liberates $NH_3$, e.g. urea, so that the injectors are injectors for liquids.

The first reduction reactor 5 consists of a first arrangement of heat exchanger tubes having heating surfaces 8 which have a first catalytic coating 9. Classical SCR catalysts such as $TiO_2/V_2O/WO_3$ or ion-exchanged zeolites are possible for the catalytic coating of the heating surfaces 8. A second measurement unit 23 which determines temperature and pollutant concentrations, in particular the concentration of NO, by means of sensors is arranged downstream of the first reduction reactor 5.

The oxidation reactor 6 is arranged downstream of the first reduction reactor 5 in the flow direction 34 of the exhaust gas 2. The oxidation reactor 6 consists of an arrangement of heat exchanger tubes which have a heating surface 10 having a second catalytic coating 11. The second catalytic coating 11 is preferably a noble metal-containing catalyst such as platinum on aluminum oxide or a ZSM5 zeolite exchanged with ammonium ions ($Pt-NH_4ZSM5$) as support material. Owing to the high activity of noble metal-containing catalysts, a fraction of the geometric surface area (for example 10-20%) of the first catalytic coating 9 of the first reduction reactor 5 is sufficient as second catalytic coating 11.

A second injection device 15 which like the first injection device 14 has a number of nozzle openings 18 for introduction of a reducing agent 19 is arranged downstream of the oxidation reactor 5. The requirements which the second injection device has to meet are the same as in the case of the first injection device 14. The exhaust gas 2 which has been admixed with reducing agent 19 subsequently flows in the flow direction 34 into the second reduction reactor 7. The second reduction reactor 7 likewise has a number of heat exchanger tubes which on their respective heating surfaces 12 have a third catalytic coating.

In the second reduction reactor, the fast SCR reaction of NO and $NO_2$ with $NH_3$ to form $N_2$ and $H_2O$ preferably takes place at a temperature of for example from 80 to 250° C.

The exhaust gas 2 is subsequently taken off, with the third measurement unit having a series of further sensors being installed in order to measure temperature and pollutant concentrations. An exhaust gas 2 which has been freed of nitrogen oxides $NO_x$ leaves the waste heat steam generator 27 in the flow direction 34.

Since the oxidation reactor 6 and the second reduction reactor 7 can be operated at relatively low temperatures, it is possible to use relatively sensitive processes, e.g. coating by the sol-gel method, which have the advantage of relatively high active surface area and thus relatively high catalytic reaction rates but cannot be used at high temperatures because of the risk of sintering for producing the first catalytic coating 9 and the second catalytic coating.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A process for the reduction of nitrogen oxides $NO_x$ in a nitrogen oxide-containing exhaust gas ($AG_1$) from a combustion process, wherein
    a) the exhaust gas ($AG_1$) and a reducing agent ($R_1$) are fed into a first reaction process ($K_1$), where part of the nitrogen oxides $NO_x$ present in the exhaust gas is reduced to water $H_2O$ and nitrogen $N_2$ by selective catalytic reduction at a first reaction temperature ($T_1$) to form an exhaust gas ($AG_2$) which has a reduced nitrogen oxide content $NO_x$,
    b) part of the nitrogen monoxide NO present in the exhaust gas ($AG_2$) having a reduced nitrogen oxide content $NO_x$ is oxidized to nitrogen dioxide $NO_2$ by means of oxygen $O_2$ at a reaction temperature ($T_2$) in a second reaction process ($K_2$) to form an exhaust gas ($AG_3$) having a ratio (V) of nitrogen monoxide NO to nitrogen dioxide $NO_2$,
    c) the exhaust gas ($AG_3$) and a reducing agent ($R_2$) are fed into a third reaction process ($K_3$), where nitrogen monoxide NO and nitrogen dioxide $NO_2$ are reduced to water $H_2O$ and nitrogen $N_2$ by means of the reducing agent ($R_2$) at a reaction temperature ($T_3$) by means of fast selective catalytic reduction to form an exhaust gas ($AG_4$) which has been essentially freed of nitrogen oxides $NO_x$.

2. The process as claimed in claim 1, wherein the reaction temperature ($T_1$) is set in the range from 250° C. to 450° C., the reaction temperature ($T_3$) is set in the range from 80° C. to 250° C. and the reaction temperature ($T_2$) is set to a value between ($T_1$) and ($T_2$).

3. The process as claimed in claim 1, wherein the reducing agent ($R_1$) introduced into the exhaust gas ($AG_1$) is introduced via a first regulating process so that, on average over time, complete conversion of the reducing agent ($R_1$) is achieved in the first catalysis process ($K_1$).

4. The process as claimed in claim 3, wherein, in the first regulating process,
    a) the exhaust gas mass flow ($Q_{Ag1}$), the nitrogen monoxide NO concentration ($C_1$) and the exhaust gas temperature ($T_4$) are measured in a first measurement procedure ($P_1$) upstream of the first catalysis process ($K_1$) and an expected concentration ($C_2$) of nitrogen monoxide NO after the first catalysis process ($K_1$) is determined as a function of temperature, loading of ammonia $NH_3$ in the first catalysis process ($K_1$) and the nitrogen monoxide NO concentration ($C_1$) in a first evaluation and control process with the aid of characteristic data for the nitrogen monoxide reduction,
- b) the nitrogen monoxide NO concentration ($C_3$) is measured in a second measurement procedure ($P_2$) between the first catalysis process ($K_1$) and the second catalysis process ($K_2$),
- c) the calculated concentration ($C_2$) is compared with the measured concentration ($C_3$) and the amount of the first reducing agent ($R_1$) introduced is reduced by means of a first control process as soon as the calculated concentration ($C_2$) becomes lower than the measured concentration ($C_3$).

5. The process as claimed in claim 1, wherein the second catalysis process ($K_2$) is controlled in such a way that a largely balanced ratio V of nitrogen monoxide NO to nitrogen dioxide $NO_2$ of about 1 is achieved.

6. The process as claimed in claim 1, wherein the second reducing agent ($R_2$) which is introduced into the exhaust gas ($AG_3$) is introduced via a second regulating process so that, on average over time, complete conversion of the reducing agent $R_2$ is achieved in the third catalysis process ($K_3$).

7. The process as claimed in claim 6, wherein, in the second regulating process
- a) the exhaust gas temperature ($T_5$) and the exhaust gas mass flow ($Q_{Ag2}$) are measured in the second measurement procedure ($P_2$) before the second catalysis process ($K_2$) and the concentration ($C_4$) of nitrogen dioxide $NO_2$ and a degree of reduction (G) which can be achieved in the catalysis process ($K_3$) is determined in a second evaluation and regulating process on the basis of characteristic data for the catalysis process ($K_2$),
- b) the exhaust gas temperature ($T_5$) and the nitrogen dioxide $NO_2$ concentration ($C_5$) is measured in a third measurement procedure ($P_3$) after the third catalysis process ($K_3$),
- c) the calculated concentration ($C_4$) is compared with the measured concentration ($C_5$) and the amount of the second reducing agent ($R_2$) introduced is set by means of a second control process on the basis of the achievable degree of reduction (G) and is reduced as soon as the calculated concentration ($C_2$) becomes smaller than the measured concentration ($C_5$).

8. The process as claimed in claim 1, wherein ammonia $NH_3$ or an ammonia-releasing substance is used as reducing agent ($R_1$, $R_2$).

9. The process as claimed in claim 1, characterized by use in a fossil fuel-fired power station.

10. A catalytic exhaust gas purification apparatus for the reduction of nitrogen oxides in an exhaust gas from a fossil fuel-fired power station, having a heating gas channel extending along a flow direction and a reactor space arranged in the heating gas channel, wherein the reactor space comprises a first reduction reactor for the reduction of nitrogen oxides $NO_x$ to water $H_2O$ and nitrogen $N_2$, where a first injection device is arranged upstream of the first reduction reactor, an oxidation reactor for the oxidation of nitrogen monoxide NO to nitrogen dioxide $NO_2$ located downstream of the first reduction reactor and a second reduction reactor for the reduction of nitrogen oxides $NO_x$ to water $H_2O$ and nitrogen $N_2$ located downstream of the oxidation reactor, wherein a second injection device is arranged upstream of the second reduction reactor.

11. The catalytic exhaust gas purification apparatus as claimed in claim 10, wherein the first reduction reactor comprises heating surfaces which on at least part of them have a first catalytic coating, where the first catalytic coating is selective for nitrogen oxides $NO_x$ and is stable up to a temperature of 500° C.

12. The catalytic exhaust gas purification apparatus as claimed in claim 11, wherein the first catalytic coating and the third catalytic coating are SCR catalyst layers which have thicknesses of greater than 10 μm and less than 50 μm so that a reduction reaction of nitrogen oxides $NO_x$ with ammonia $NH_3$ to form water $H_2O$ and nitrogen $N_2$ can be carried out.

13. The catalytic exhaust gas purification apparatus as claimed in claim 11, wherein the heating surfaces are superheater heating surfaces, vaporizer heating surfaces or economizer heating surfaces.

14. The catalytic exhaust gas purification apparatus as claimed in claim 10, wherein the oxidation reactor comprises heating surfaces (10) which on at least part of them have a second catalytic coating, where the second catalytic coating is selective for nitrogen oxides $NO_x$ and is stable up to a temperature of 300° C.

15. The catalytic exhaust gas purification apparatus as claimed in claim 14, wherein the second catalytic coating is a noble metal-containing coating which has a thickness of greater than 10 μm and less than 50 μm and whose geometric surface area is less than 30% of the geometric surface area of the first catalytic coating so that an oxidation reaction of nitrogen monoxide NO with oxygen $O_2$ to form nitrogen dioxide $NO_2$ can be carried out.

16. The catalytic exhaust gas purification apparatus as claimed in claim 10, wherein the second reduction reactor comprises heating surfaces which on at least part of them have a third catalytic coating, where the third catalytic coating is selective for nitrogen oxides $NO_x$ and is stable up to a temperature of 250° C.

17. The catalytic exhaust gas purification apparatus as claimed in claim 10, wherein the first injection device has a first regulating valve and the second injection device has a second regulating valve and the injection devices each consist of a number of nozzle openings which are distributed over the area of the reactors and the nozzle openings have a spacing from the reactors so that a reducing agent can be injected uniformly distributed over the flow cross section of the reactors.

18. The catalytic exhaust gas purification apparatus as claimed in claim 17, characterized in that a regulating device which comprises a first measurement unit and a second measurement unit which are connected in a signal-transmitting manner to a first evaluation unit is provided and the regulating device comprises a third measurement unit which is connected in a signal-transmitting manner to a second evaluation unit and the first evaluation unit is connected in a signal-transmitting manner to the first regulating valve and the second evaluation unit is connected in a signal-transmitting manner to the second regulating valve.

19. A waste heat steam generator comprising a catalytic exhaust gas purification apparatus as claimed in claim 10.

* * * * *